United States Patent
Zhang et al.

(10) Patent No.: US 8,660,497 B1
(45) Date of Patent: Feb. 25, 2014

(54) BEAMSTEERING IN A SPATIAL DIVISION MULTIPLE ACCESS (SDMA) SYSTEM

(75) Inventors: Hongyuan Zhang, Fremont, CA (US); Sudhir Srinivasa, Sunnyvale, CA (US); Rohit U. Nabar, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 403 days.

(21) Appl. No.: 12/855,521

(22) Filed: Aug. 12, 2010

Related U.S. Application Data

(60) Provisional application No. 61/234,925, filed on Aug. 18, 2009.

(51) Int. Cl.
*H04B 1/00* (2006.01)
(52) U.S. Cl.
USPC ............ 455/63.1; 455/69; 455/522; 370/342; 370/252
(58) Field of Classification Search
USPC ............. 455/562.1, 446, 15, 132, 272, 187.1, 455/550.1, 561; 370/342, 335, 252, 312, 370/330, 329, 338, 401
See application file for complete search history.

(56) References Cited

U.S. PATENT DOCUMENTS

| | | | | |
|---|---|---|---|---|
| 7,039,442 | B1 * | 5/2006 | Joham et al. | ................ 455/562.1 |
| 2003/0153316 | A1 * | 8/2003 | Noll et al. | ..................... 455/446 |
| 2004/0066754 | A1 * | 4/2004 | Hottinen | ....................... 370/252 |
| 2005/0152299 | A1 | 7/2005 | Stephens | |
| 2005/0157805 | A1 | 7/2005 | Walton et al. | |
| 2005/0195733 | A1 | 9/2005 | Walton et al. | |
| 2007/0086400 | A1 * | 4/2007 | Shida et al. | ................... 370/338 |
| 2007/0142089 | A1 * | 6/2007 | Roy | ........................... 455/562.1 |
| 2007/0155336 | A1 | 7/2007 | Nam et al. | |
| 2007/0201566 | A1 | 8/2007 | Solomon et al. | |
| 2007/0293214 | A1 | 12/2007 | Ansari et al. | |
| 2007/0298742 | A1 | 12/2007 | Ketchum et al. | |
| 2008/0075058 | A1 * | 3/2008 | Mundarath et al. | ........... 370/342 |
| 2008/0076370 | A1 * | 3/2008 | Kotecha et al. | ............ 455/187.1 |
| 2008/0187032 | A1 | 8/2008 | Pande et al. | |
| 2008/0247370 | A1 | 10/2008 | Gu et al. | |
| 2009/0196163 | A1 | 8/2009 | Du | |
| 2009/0245153 | A1 * | 10/2009 | Li et al. | ......................... 370/312 |

(Continued)

FOREIGN PATENT DOCUMENTS

| | | | |
|---|---|---|---|
| EP | | 2106038 A1 | 9/2009 |
| WO | WO-2005/081483 A1 | | 9/2005 |

OTHER PUBLICATIONS

Zhang et al., "Asynchronous Interference Mitigation in Cooperative Base Station Systems," IEEE Trans. on Wireless Communications, vol. 7, No. 1, Jan. 2008.

(Continued)

*Primary Examiner* — Edward Urban
*Assistant Examiner* — Golam Sorowar

(57) ABSTRACT

A method in a communication network includes obtaining a description of a first communication channel associated with a first receiver; obtaining a description of a second communication channel associated with a second receiver; and generating a steering vector using each of the description of the first communication channel and the description of the second communication channel; where the steering vector is used to transmit first data to the first receiver via a plurality of antennas over the first communication channel simultaneously with second data being transmitted to the second receiver via the plurality of antennas over the second communication channel.

17 Claims, 5 Drawing Sheets

(56) References Cited

U.S. PATENT DOCUMENTS

| | | | |
|---|---|---|---|
| 2009/0274226 A1 | 11/2009 | Mondal et al. | |
| 2009/0296650 A1* | 12/2009 | Venturino et al. | 370/330 |
| 2010/0041406 A1* | 2/2010 | Kim et al. | 455/446 |
| 2010/0046656 A1 | 2/2010 | van Nee et al. | |
| 2010/0246702 A1 | 9/2010 | Miyoshi | |
| 2011/0199946 A1 | 8/2011 | Breit et al. | |
| 2011/0305205 A1 | 12/2011 | Gong et al. | |
| 2012/0039196 A1 | 2/2012 | Zhang | |

OTHER PUBLICATIONS

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

"IEEE P802.11n™ /D3.00, Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

van Nee, et al. "The 802.11n MIMO-OFDM Standard for Wireless LAN and Beyond," Wireless Personal Communications, vol. 37, pp. 445-453 (Jun. 2006).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-11 (2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-46 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-31 (2009).

Shi et al., "Phase Tracking During VHT-LTF," Doc. No. IEEE 802.11-10/0771r0, *The Institute of Electrical and Electronics Engineers, Inc.*, Jul. 2010.

van Zelst et al., "Pilot Sequence for VHT-DATA," Doc. No. IEEE 802.11-10/0811r1, *The Institute of Electrical and Electronics Engineers, Inc.*, Jul. 2010.

\* cited by examiner

BEAMSTEERING IN A SPATIAL DIVISION MULTIPLE ACCESS (SDMA) SYSTEM

CROSS-REFERENCE TO RELATED APPLICATION

This application claims the benefit of the U.S. Provisional Patent Application No. 61/234,925, entitled "DL-SDMA Steering Algorithms," filed on Aug. 18, 2009, the entire disclosure of which is hereby incorporated by reference herein.

FIELD OF THE DISCLOSURE

The present disclosure relates generally to communication networks and, more particularly, to wireless networks that utilize spatial division multiple access (SDMA).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11 In Standard specifies a single-user peak throughput of 600 Mbps.

WLANs typically operate in either a unicast mode or a multicast mode. In the unicast mode, an access point (AP) transmits information to one client station at a time. In the multicast mode, the same information is transmitted to a group of client stations concurrently.

Antennas and, accordingly, associated effective wireless channels are highly directional at frequencies near or above 60 GHz. When multiple antennas are available at a transmitter, a receiver, or both, it is therefore important to apply efficient beam patterns using the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission.

SUMMARY

In an embodiment, a method in a communication network includes obtaining a description of a first communication channel associated with a first receiver; obtaining a description of a second communication channel associated with a second receiver; and generating a steering vector using each of the description of the first communication channel and the description of the second communication channel; where the steering vector is used to transmit first data to the first receiver via a plurality of antennas over the first communication channel simultaneously with second data being transmitted to the second receiver via the plurality of antennas over the second communication channel.

In another embodiment, an apparatus includes a steering vector controller configured to generate a first steering vector using each of a description of a first communication channel and a description of a second communication channel, and generate a second steering vector using each of the description of the first communication channel and the description of the second communication channel, where the first steering vector and the steering vector are used to simultaneously transmit first data and second data via an antenna array over the first communication channel and the second communication channel, respectively.

In another embodiment, a system comprises a transmitter including a plurality of antennas and a steering vector controller, where the system further comprises a plurality of receivers, such that the transmitter and each of the plurality of receivers are associated with a corresponding communication channel to define a plurality of communication channels, and where the steering vector controller is configured to generate a plurality of steering vectors based on a description of the plurality of communication channels, where the plurality of steering vectors are used to simultaneously transmit a plurality of data units to the plurality of receivers via the plurality of antennas over the plurality of communication channels.

In another embodiment, a method in an access point (AP) for generating a first steering vector and a second steering vector to be used for simultaneous transmission of first data to a first station and second data to a second station, respectively, includes receiving a first signal from the first station via a first communication channel, where the first signal includes an indication of a first null-steering vector corresponding to a null-space projection of the first communication channel; receiving a second signal from the second station via a second communication channel, where the second signal includes an indication of a second null-steering vector corresponding to a null-space projection of the second communication channel: generating the first steering vector using the indication of the first null-steering vector; and generating the first steering vector using the indication of the second null-steering vector.

DETAILED DESCRIPTION

In embodiments described below, a wireless network device such as an access point (AP) of a wireless local area network (WLAN) transmits independent data streams to multiple client stations simultaneously via an antenna array. To reduce interference at a receiving station due to transmissions from the AP to one or more other stations, the AP develops respective transmit (Tx) beamsteering (hereinafter, "steering") vectors for downlink transmissions to each station. In an embodiment, the AP develops a Tx steering vector for a certain station using a description of the wireless communication channel between the AP and the station, as well a description of at least one other wireless communication channel between the AP and another station. In another embodiment, the AP uses the description of the wireless channel between the AP and a certain station to develop a Tx steering vector for the station, but does not use descriptions of wireless communication channels between the AP and other stations.

In other words, according to this embodiment, the AP develops independent Tx steering vectors for the stations.

In some embodiments, an AP obtains a description of several wireless communication channels (hereinafter, "channel descriptions") through which the AP transmits data to corresponding stations. As discussed below, depending on the embodiment, the AP uses the channel descriptions to generate Tx steering vectors so as to (i) cancel known interference at each station as well as interference between space-time streams at each station, (ii) minimize receiver input mean square error (MSE) at each station, (iii) minimize "leakage" of a signal transmitted to one of the stations to the other stations, and/or (iv) cancel known interference among each of the several stations without necessarily canceling interference between different spatial streams of each station. In at least some of these embodiments, the AP develops multiple Tx steering vectors corresponding to different stations at the same time. In another embodiment, the AP generates a Tx steering vector for a certain station using the channel descriptor corresponding to the communication channel between the AP and the station with no regard to channel descriptors corresponding to other communication channels.

Figure 1:
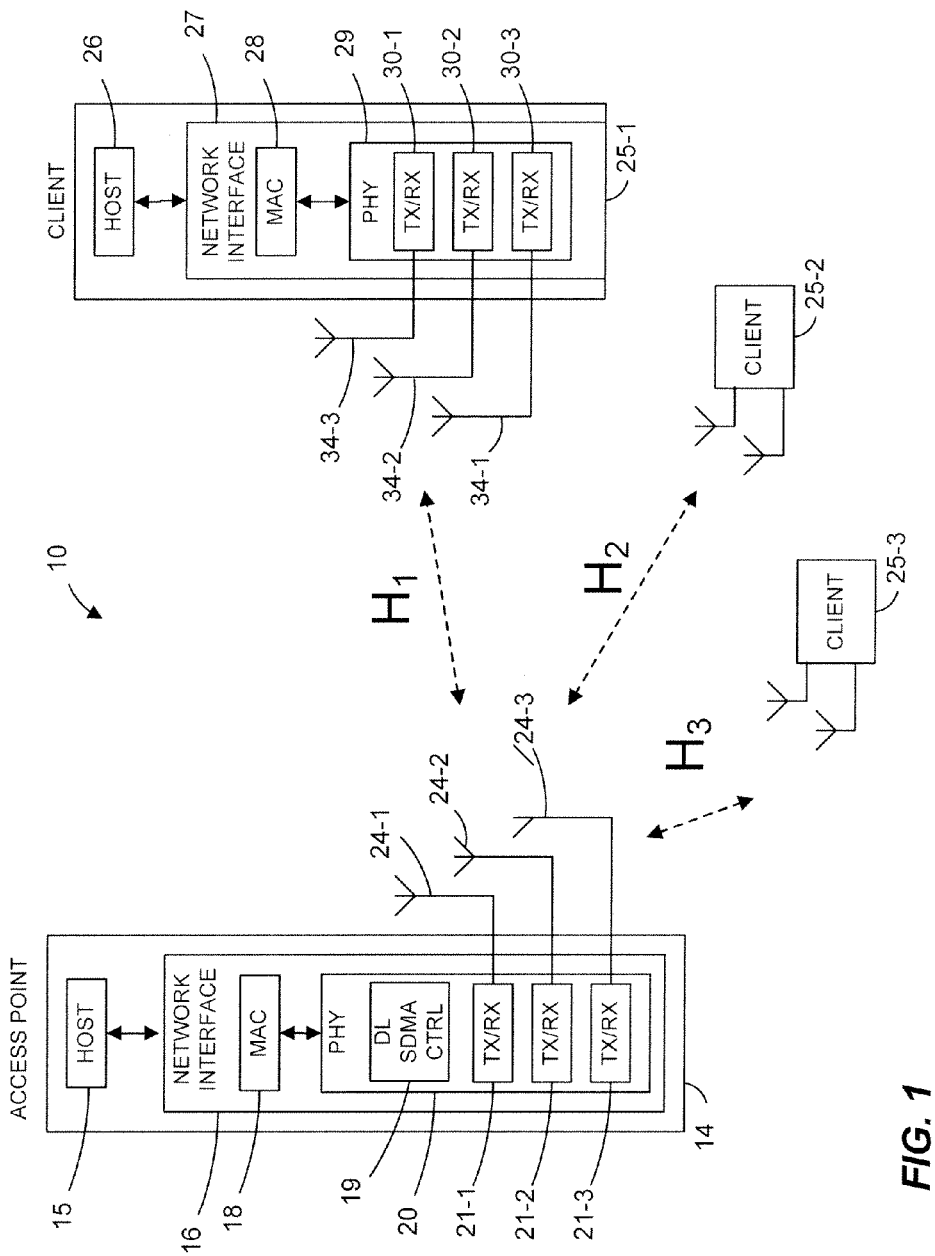
FIG. 1 a block diagram of an example wireless local area network (WLAN) in which an access point (AP) utilizes downlink (DL) Spatial-Division Multiple Access (SDMA) beamsteering techniques in accordance with an embodiment of the present disclosure.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes $N_T$ transceivers 21, and the transceivers are coupled to $N_T$ antennas 24. Although three transceivers 21 and three antennas 24 are illustrated in FIG. 1 (i.e., $N_T$=3), the AP 14 can include different numbers (e.g., $N_T$=2, 4, 5, etc.) of transceivers 21 and antennas 24 in other embodiments. The PHY unit 20 also includes a downlink (DL) Spatial-Division Multiple Access (SDMA) controller 19 that implements one or several of the techniques for developing steering vectors described herein.

The WLAN 10 includes K client stations 25, each station 25-$i$ equipped with $N_i$ antennas. Although three client stations 25 are illustrated in FIG. 1 (i.e., K=3), the WLAN 10 can include different numbers (e.g., K=2, 4, 5, 6, etc.) of client stations 25 in various scenarios and embodiments. Two or more of the client stations 25 are configured to receive corresponding data streams having been simultaneously transmitted from the AP 14.

A client station 25-1 includes a host processor 26 coupled to a network interface 27. The network interface 27 includes a MAC unit 28 and a PHY unit 29. The PHY unit 29 includes $N_1$ transceivers 30, and the $N_1$ transceivers 30 are coupled to $N_1$ antennas 34. Although three transceivers 30 and three antennas 34 are illustrated in FIG. 1 (i.e., $N_1$=3), the client station 25-1 can include different numbers of transceivers 30 and antennas 34 (e.g., $N_1$=1, 2, 4, 5, etc.) in other embodiments. The client stations 25-2 and 25-3 have a structure that is the same as or generally similar to the client station 25-1. In an embodiment, each of the client stations 25-2 and 25-3 is structured like the client station 25-1 but has only two transceivers and two antennas (i.e. $N_2$=$N_3$=2). In other embodiments, the client stations 25-2, and 25-3 can include different numbers of antennas (e.g., 1, 3, 4, 5, etc.).

In an embodiment, the AP 14 is configured to transmit multiple spatial streams to the client stations 25-1, 25-2, and 25-3, so that each of client stations 25-$i$ receives data via $L_i$ spatial streams. For example, the client station 25-1 receives data via three (i.e., $L_1$=3) spatial streams. Although in this example $L_1$=$N_1$, a client station 25-$i$ in general can utilize fewer spatial stream than the number of antennas with which the client station 25-$i$ is equipped.

Further, when space-time coding is employed, the multiple spatial streams are sometimes referred to by those of ordinary skill in the art as space-time streams. If the number of space-time streams is less than the number of transmit chains, spatial mapping is employed, in some embodiments.

In an embodiment, the AP 14 communicates with the client station 25-1 over a multiple input, multiple output (MIMO) channel defined, at the one end, by the array including the antennas 24-1, 24-2, and 24-3 and, at the other end, by the array including the antennas 34-1. 34-2, and 34-3. The MIMO channel can be described by a three-by-three channel matrix $H_1$ that specifies, in each element, a channel gain parameter for a stream defined by the corresponding transmit antenna and a receive antenna. Similarly, the AP communicates with the clients 25-2 and 25-3 via MIMO channels described by matrices $H_2$ and $H_3$, respectively. In at least some embodiments, the dimensionality of a matrix $H_i$ describing a MIMO channel between the AP 14 and a client station 25-$i$ is $N_i \times N_T$.

During operation, the AP 14 transmits a symbol to a client station 25-$i$ as a transmit symbol vector $x_i$ of dimensionality $L_i \times 1$, and the client station 25-$i$ receives a signal that can be represented as a vector $y_i$ of dimensionality $N_i \times 1$. In an embodiment, the AP 14 applies a respective steering vector $W_i$ of dimensionality $N_T \times L_i$ to the transmit symbol vector $x_i$ prior to transmitting the signal via the corresponding channel $H_i$. Thus, when the AP 14 simultaneously transmits data to stations 25-1, 25-2, ... 25-K, the signal received at the client station 25-$i$ can be expressed as $$y_i = \underbrace{H_i W_i x_i}_{\text{intended}} + \underbrace{H_i \sum_{k \neq i} W_k x_k}_{\text{interference}} + \underbrace{n_i}_{\text{noise}} \quad \text{(Eq. 1)}$$

As illustrated by Eq. 1, the received signal includes an intended component, an interference component due to signals intended for other client stations, and a noise component (expressed as a vector $n_i$ of dimensionality $N_i \times 1$). Eq. 1 also can be written as $$y_i = H_i W_i x_i + H_i \sum_{k \neq i} W_k x_k + n_i = \quad \text{(Eq. 2)}$$

$$H_i [ W_1 \quad W_2 \quad \ldots \quad W_K ] \begin{bmatrix} x_1 \\ x_2 \\ \vdots \\ x_K \end{bmatrix} + n_i = H_i W x + n_i, \quad i = 1 \ldots K$$

where $$W = [ W_1 \quad W_2 \quad \ldots \quad W_K ], \, x = \begin{bmatrix} x_1 \\ x_2 \\ \vdots \\ x_K \end{bmatrix}$$

Further, the signals $y_1, y_2, \ldots Y_K$ can be "stacked" together to define an aggregate receive vector y:

$$y = \begin{bmatrix} y_1 \\ y_2 \\ \vdots \\ y_K \end{bmatrix} = H_T W \begin{bmatrix} x_1 \\ x_2 \\ \vdots \\ x_K \end{bmatrix} + \begin{bmatrix} n_1 \\ n_2 \\ \vdots \\ n_K \end{bmatrix} = H_W x + n \quad \text{(Eq. 3)}$$

where $$H_T = \begin{bmatrix} H_1 \\ H_2 \\ \vdots \\ H_K \end{bmatrix}, H_W = \begin{bmatrix} H_1 W_1 & H_1 W_2 & \ldots & H_1 W_K \\ H_2 W_1 & H_2 W_2 & \ldots & H_2 W_K \\ \vdots & \vdots & \vdots & \vdots \\ H_K W_1 & H_K W_2 & \ldots & H_K W_K \end{bmatrix},$$

$$\text{and } n = \begin{bmatrix} n_1 \\ n_2 \\ \vdots \\ n_K \end{bmatrix}.$$

To improve the overall throughput of the WLAN 10, it is desirable to reduce the interference components as much as possible for as many stations as possible, preferably without attenuating the intended components. To this end, in other embodiments, the DL SDMA controller 19 develops the aggregate steering matrix W (that includes the individual vectors $W_i$, $W_2$ ... $W_K$) so as to achieve a configuration optimal for the overall group of K client stations 25. However, in other embodiments, the DL SDMA controller 19 develops vectors $W_i$ individually (e.g. sequentially).

Figure 2:
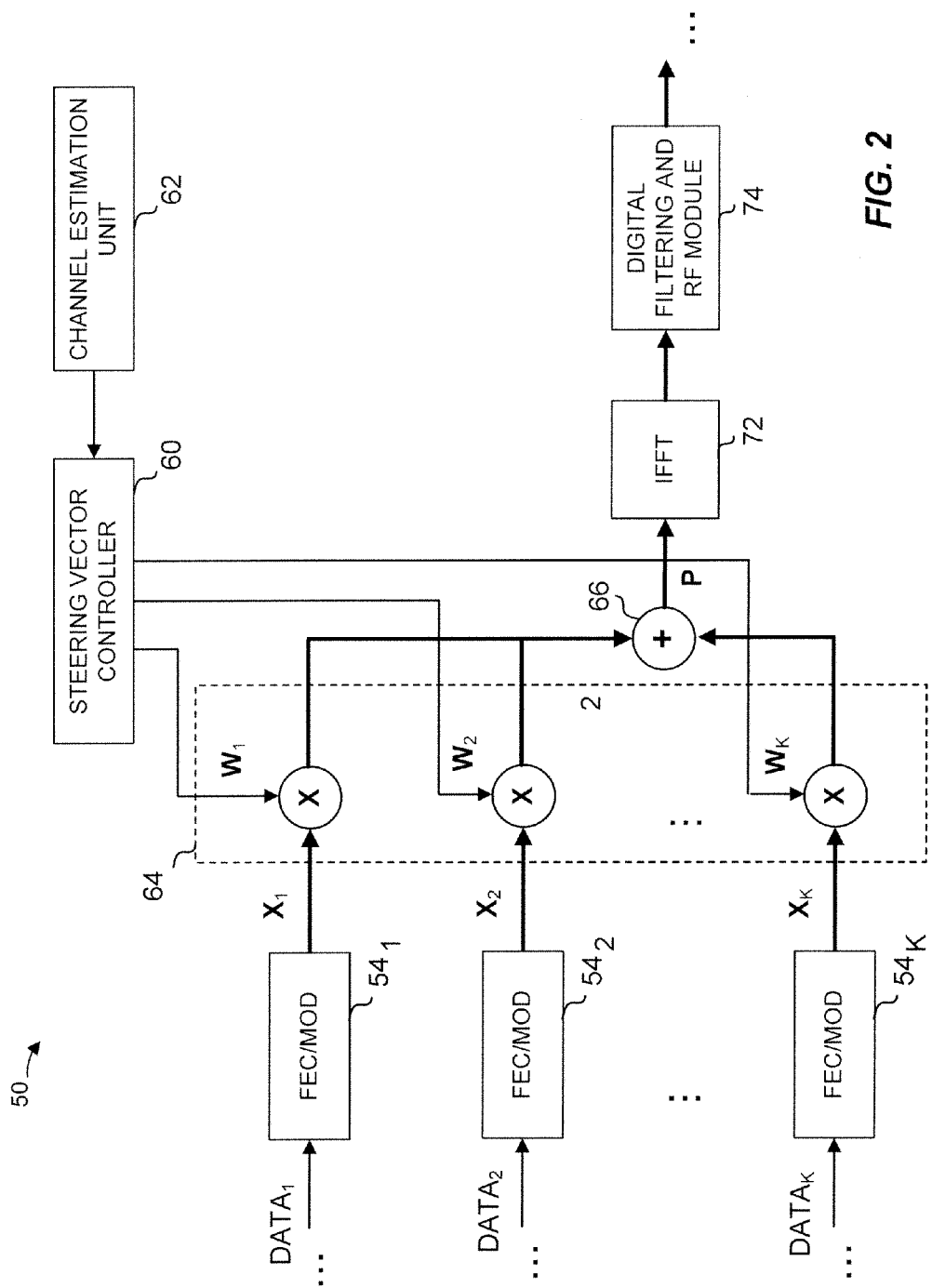
FIG. 2 is a block diagram of a DL SDMA controller that is used in an AP that implements beamsteering techniques of the present disclosure, according to an embodiment.

Referring to FIG. 2, a DL SDMA controller 50 operates as the DL SDMA controller 19, according to an embodiment. The DL SDMA controller 50 receives a plurality data streams $DATA_1$, $DATA_2$, ... $DATA_K$ to be simultaneously transmitted to respective client stations. Depending on the embodiment, the data streams $DATA_1$, $DATA_2$, ... $DATA_K$ include packets, frames, or other data units. A set of K forward error correction (FEC) and modulation units 54 processes the data streams $DATA_1$, $DATA_2$, ... $DATA_K$ to generate transmit symbol vectors $x_i$, $x_2$, ... $x_K$. A spatial steering unit 64 then applies a respective steering vector $W_i$ to each transmit symbol vector $x_i$. In an embodiment, an adder 66 combines the resulting product vectors into an aggregate product vector.

In an embodiment, a steering vector controller 60 receives channel descriptions from a channel estimation unit 62 to develop steering vectors $W_i$, $W_2$, ... $W_K$ that are supplied to the spatial steering unit 64. According to an embodiment, each channel description includes channel gain parameters (which may be complex numbers) for various streams defined by transmit and receive antennas. As discussed above, a channel description in some embodiments is represented in a matrix format. In some embodiments, the channel estimation unit 62 performs measurement of one or several parameters associated with the physical channel to develop channel state information (CSI) or another metric. In another embodiment, the channel estimation unit 62 receives CSI feedback information for various channels from stations associated with these channels. In general, the channel estimation unit 62 can implement any suitable technique for developing channel descriptions, including those currently known to those of ordinary skill in the art.

Applying the techniques described herein, the steering vector controller 60 in an embodiment generates a steering vectors $W_i$ (for transmitting data to a receiver such as a station i via a corresponding communication channel described by a matrix $H_i$) in view of both the channel described by a matrix $H_i$ and at least one other channel (described by a matrix $H_j$, for example). In an embodiment, the steering vector controller 60 generates the steering vectors $W_i$, $W_2$, ... $W_K$ concurrently in view of the channel descriptors $H_1$, $H_2$, ... $H_K$ to minimize (or, at least, attempt to minimize) interference at each station. Several example algorithms that the steering vector controller 60 implements to minimize interference at one or more stations, according to some embodiments, are discussed with reference with FIGS. 3A-E.

With continued reference to FIG. 2, the output of the adder 66 (e.g., an aggregate product vector P) is supplied to an inverse discrete Fourier transform module (e.g., an inverse fast Fourier transform (IFFT) module) 72, according to an embodiment. The IFFT module 72 in turn is coupled to a digital filtering and RF module 74. Once processed by the IFFT module 72 and the digital filtering and RF module 74, the data corresponding to the aggregate product vector is transmitted via an antenna array. As indicated above, an efficient set of steering vectors $W_i$, $W_2$, ... $W_K$ results in a transmission pattern such that the intended components of the transmitted signals are transmitted to the corresponding receiving stations, while the interference components at each station are minimized, e.g., reduced to zero or nearly zero.

Prior to discussing several example techniques for generating a set of steering vectors $W_i$, $W_2$, ... $W_K$ in view of multiple channel descriptors, an approach to developing a certain steering vector $W_i$ (to be used for transmitting data over a channel described by a channel descriptor $H_i$) based on the channel descriptor H; but not on other channel descriptors is considered next.

Figure 3A:
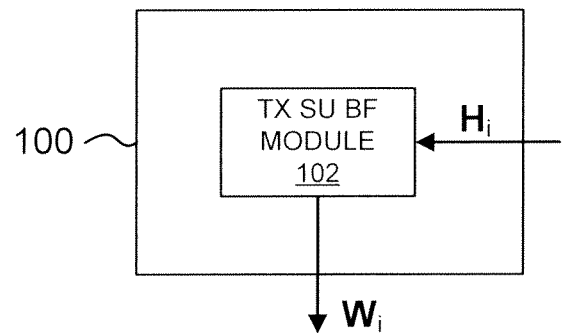
FIG. 3A is a block diagram of a steering vector controller that generates beamsteering vectors using a single-user beamforming (SU-BF) technique, used in a DL SDMA controller according to an embodiment.

Referring to FIG. 3A, a steering vector controller 100 includes a transmit single user beamforming (Tx SU-BF) module 102. The Tx SU-BF module 102 receives a channel descriptor $H_i$ and develops a Tx steering vector $W_i$ without considering interference at other client stations. In an embodiment, the Tx SU-BF module 102 implements a singular value decomposition (SVD) technique to generate a steering vector $W_i$ for a multi-stream wireless communication channel described by the channel descriptor $H_i$:

$$W_i = SVD(H_i) \quad \text{(Eq. 4)}$$

In another embodiment or another mode of operation, the SU-BF module 102 generates a steering vector $W_j$ for a single-stream wireless communication channel described by a channel descriptor $H_j$:

$$W_j = \text{Cophase}(H_j) \quad \text{(Eq. 5)}$$

In an embodiment, the SU-BF module 102 iteratively develops steering vectors $W_1, W_2, \ldots W_K$ for use with communication channels described by channel descriptors $H_1, H_2 \ldots H_K$ (corresponding to stations with indexes $1, 2, \ldots K$, respectively). It is noted that in at least some situations, the technique discussed with reference to FIG. 3A results in significant co-channel interference (CCI) between stations if multiple streams are used for each station. On the other hand, if a single stream is used for each user, the stations experience relatively small CCI.

Figure 3B:
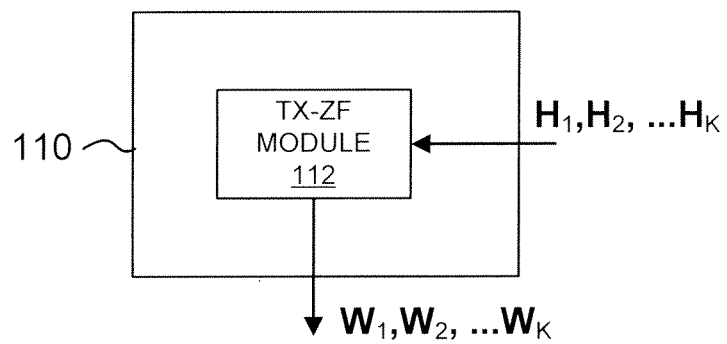
FIG. 3B is a block diagram of a steering vector controller that generates beamsteering vectors using a zero-forcing (ZF) technique, used in a DL SDMA controller according to an embodiment.

Referring to FIG. 3B, a steering vector controller 110 includes a transmit zero-forcing (Tx-ZF) module 112. The Tx-ZF module 112 receives channel descriptors $H_1, H_2 \ldots H_K$ and outputs corresponding steering vectors $W_1, W_2 \ldots W_K$. In an embodiment, the Tx-ZF module 12 designs each steering vector $\{W_i\}_{i=1 \ldots K}$ so that $$H_W = H_T W = I \quad \text{(Eq. 6)}$$

Thus, $$W = \alpha H_T^\dagger = \alpha H_T^H (H_T H_T^H)^{-1} \quad \text{(Eq. 7)}$$

which requires that $H_T H_T^H$ is singular, so $$N_T \geq \sum_{i=1}^{K} N_i,$$

and where $\alpha$ is the transmit power normalization factor for each station (or user).

As will be understood, the Tx-ZF module 112 fully diagonalizes the matrix $H_T$, and accordingly the number of spatial streams for each station is the same as the corresponding number of receive antennas (i.e., $L_i = N_i$). Thus, in at least some embodiments in which an AP implements the steering vector controller 110, the stations do not support modulation and coding scheme (MCS) adaptation to a lower number of streams. In an extreme case, (e.g., a line of sight (LOS) channel or an ill-conditioned channel), more than one spatial stream may be broken in a communication link. Further, in at least some embodiments, the technique implemented by the steering vector controller 110 is associated with a less-than-optimal power efficiency. In other words, given the same power amplifier (PA) output power, a post-processing signal-to-noise ratio (SNR) at a receiving station may be low because a large portion of the transmit power is used for interference cancellation between stations (users) as well as between spatial streams.

Figure 3C:
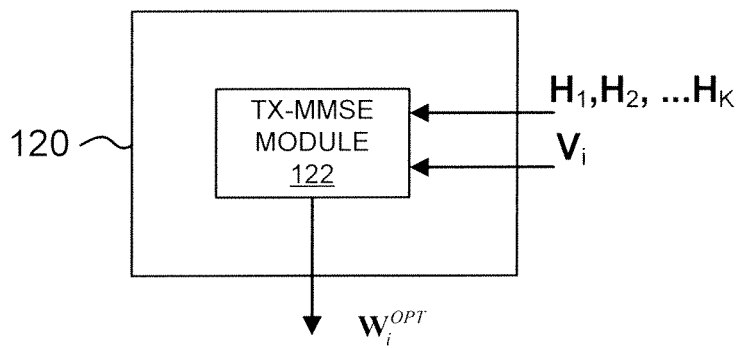
FIG. 3C is a block diagram of a steering vector controller that generates beamsteering vectors using a minimum mean square error (MMSE) technique, used in a DL SDMA controller according to an embodiment.

Now referring to FIG. 3C, a steering vector controller 120 includes a transmit minimum mean square error (Tx-MMSE) module 122. The Tx-MMSE module 122 receives channel descriptors $H_1, H_2 \ldots H_K$ and outputs corresponding steering vectors $W_1, W_2 \ldots W_K$. In an embodiment, the Tx-MMSE module 122 is generally similar to an MMSE receiver for harmonizing interference cancellation and noise enhancement. During operation, the Tx-MMSE module 122 generates steering vectors $W_1, W_2, \ldots W_K$ so as to minimize (or, at least, attempt to minimize) receiver input MSE at each receiving station (i.e. the receiver input signal before equalization that is unknown at the transmitting device). To this end, the Tx-MMSE module 112 implements the following design rule:

$$\{W_i^{opt}\} = \underset{\{W_i\}}{\arg\min} \sum_{i=1}^{K} MSE_i \quad \text{(Eq. 8)}$$

where $$MSE_i = E[\|y_i - H_i V_i x_i\|^2] \quad \text{(Eq. 9)}$$

and $V_i$ is any SU-BF steering matrix for a station i, e.g., $$V_i = SVD(H_i) \quad \text{(Eq. 10)}$$

In another embodiment, the vector $V_i$ is an unsteered spatial mapping matrix.

Using Eq. 8 and Eq. 9, the following derivation is possible:

$$\begin{aligned} MSE_i &= E[\|y_i - H_i V_i x_i\|^2] \\ &= E\left[\left(H_i(W_i - V_i)x_i + H_i \sum_{k \neq i} W_k x_k + n_i\right)^H \left(H_i(W_i - V_i)x_i + H_i \sum_{k \neq i} W_k x_k + n_i\right)\right] \\ &= Tr\left\{E\left[\left(H_i(W_i - V_i)x_i + H_i \sum_{k \neq i} W_k x_k + n_i\right) \left(H_i(W_i - V_i)x_i + H_i \sum_{k \neq i} W_k x_k + n\right)^H\right]\right\} \\ &= Tr\{H_i(W_i W_i^H - V_i W_i^H - W_i V_i^H + \|V_i\|^2)H_i^H + H_i\left(\sum_{k \neq i} W_k W_k^H\right)H_i^H + N_0 I\} \end{aligned}$$

For Tx MMSE, an attempt is made to minimize the following Lagrange formula:

$$f(\{W_i\}_{i=1 \ldots K}) = \sum_{i=1}^{K} MSE_i + \sum_{i=1}^{K} (Tr(W_i^H W_i) - P_i)$$

where $P_i$ is the transmit power for a station i. To achieve minimization using matrix differentiation rules, the following is obtained:

$$\frac{\partial f}{\partial W_i} = 2\left(\sum_{k=1}^{K} H_k^H H_k\right) W_i - 2 H_i^H H_i V_i + 2 W_i = 0$$

It then follows that:

$$W_i^{opt} = \alpha \left( \sum_{k=1}^{K} H_k^H H_k + I \right)^{-1} H_i^H H_i V_i, \quad \text{(Eq. 11)}$$

where α is the transmit power normalization factor.

However, because this technique does not completely cancel interference, the channel dimensionality requirement in some embodiments is relaxed so that $$N_T \geq \sum_{i=1}^{K} L_i \quad \text{(Eq. 12)}$$

Thus, in an embodiment, the Tx-MMSE module 122 implements the design rule expressed by Eq. 8 using Eq. 11.

Figure 3D:
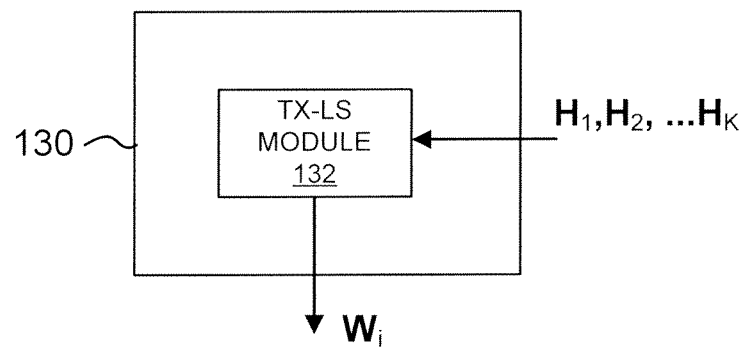
FIG. 3D is a block diagram of a steering vector controller that generates beamsteering vectors using a leakage suppression (LS) technique, used in a DL SDMA controller according to an embodiment.

Referring to FIG. 3D, a steering vector controller 130 includes a transmit leakage suppression (Tx-LS) module 132 that attempts to minimize the "leakage" of a transmitted signal to all stations for which the transmitted signal is not intended. In other words, the Tx-LS module 132 attempts to maximize the signal-to-leakage-plus-noise ratio (SLNR). To this end, the Tx-LS module 132 receives channel descriptors $H_1, H_2, \ldots H_K$ and implements the following design rule:

$$W_i^{opt} = \underset{W_i}{\operatorname{argmax}} \frac{Tr\{W_i^H (H_i^H H_i) W_i\}}{Tr\left\{W_i^H \left(N_0 N_R I + \sum_{k \neq i} H_k^H H_k\right) W_i\right\}} \quad \text{(Eq. 13)}$$

A technique that can be used to generate an implementation algorithm for the design rule expressed in Eq. 13 is described in Zhang et. al., "Asynchronous Interference Mitigation in Cooperative Base Station System." IEEE Transactions on Wireless Communications, Vol. 7, No. 1 (January 2008), incorporated by reference herein in its entirety. Using this technique, the following sub-optimal solution to the design rule in Eq. 13 is developed:

$$W_i = \alpha V_{SVD}\left(\left(N_0 N_R I + \sum_{k \neq i} H_k^H H_k\right)^{-1} (H_i^H H_i)\right) \quad \text{(Eq. 14)}$$

This sub-optimal solution maximizes the lower bound of the criteria in Eq. 13

Figure 3E:
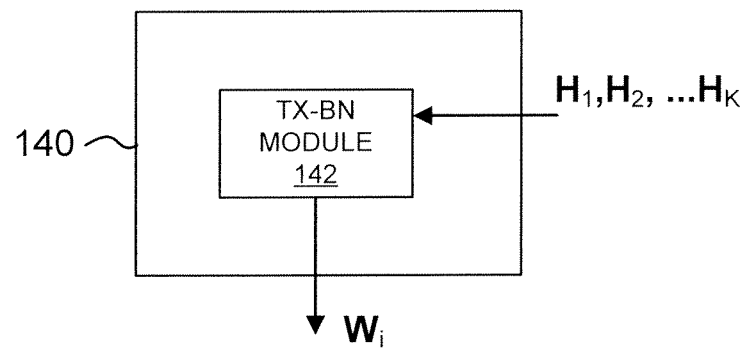
FIG. 3E is a block diagram of a steering vector controller that generates beamsteering vectors using a block nullification (BN) technique, used in an DL SDMA controller according to an embodiment.

Now referring to FIG. 3E, a steering vector controller 140 includes a transmit block nullification (Tx-BN) module 142. The Tx-BN module 142 receives channel descriptors $H_1, H_2, \ldots H_K$ and outputs corresponding steering vectors $W_i, W_2, \ldots W_K$. In an embodiment, the Tx-BN module 142 designs the steering vectors $W_i, W_2, \ldots W_K$ so as to block-diagonalize $H_W$, i.e. cancel interference between different stations, but not cancel interference between different spatial streams at each station. Thus, according to this embodiment, the product of the aggregate channel matrix $H_T$ and an aggregate steering vector W can be expressed as $$H_W = \begin{bmatrix} H_1 W_1 & 0 & \ldots & 0 \\ 0 & H_2 W_2 & \ldots & 0 \\ \vdots & \vdots & \vdots & \vdots \\ 0 & 0 & \ldots & H_K W_K \end{bmatrix} \quad \text{(Eq. 15)}$$

Thus, $H_k W_i = 0$, $k \neq i$. In other words, the steering matrix $W_i$ of a station i has to project to the null-space of the space spanned by the channels for all the other users. Therefore.

$$N_T - \operatorname{rank}(H_{\bar{i}}) \geq L_i \quad \text{(Eq. 16)}$$

and $$N_T > \operatorname{rank}(H_{\bar{i}}), \forall i \quad \text{(Eq. 17)}$$

where $H_{\bar{i}}$ is the sub-matrix of $H_T$ that excludes the rows in $H_i$.

According to an embodiment, the steering matrix $W_i$ is developed using a direct projection to null-space of $H_{\bar{i}}$:

$$W_i = \alpha(I - H_{\bar{i}}^\dagger H_{\bar{i}}) \quad \text{(Eq. 18)}$$

where $H_{\bar{i}}^\dagger$ is pseudo-inverse of $H_{\bar{i}}$:

$$H_{\bar{i}}^\dagger = H_{\bar{i}}^H (H_{\bar{i}} H_{\bar{i}}^H)^{-1}. \quad \text{(Eq. 19)}$$

According to another embodiment, the steering matrix $W_i$ is developed using an SVD approach by taking the singular vectors corresponding to the zero singular values of $H_{\bar{i}}$:

$$H_{\bar{i}} = U_i \begin{bmatrix} \sigma_1 & & & \\ & \ddots & & \\ & & \sigma_M & \\ & & & 0 \end{bmatrix} V_i, \quad W_i = \alpha V_i(0). \quad \text{(Eq. 20)}$$

Figure 4:
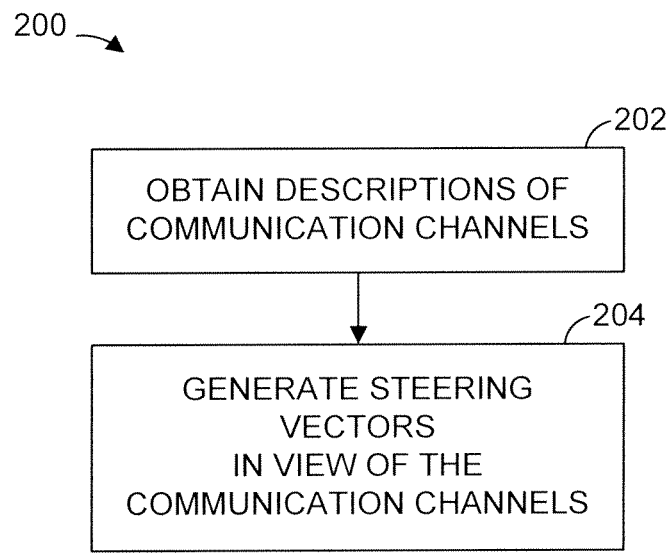
FIG. 4 is a flow diagram of an example method for generating steering vectors for use in DL SDMA transmissions, according to an embodiment.

Referring to FIG. 4, a method 200 for developing steering vectors for simultaneous transmission of data to two or more stations. The DL SDMA controller 19 or the DL SDMA controller 50, for example, are configured to implement the method 200, according to some embodiments. At block 202, descriptions of two or more communication channels are obtained by developing CSI metrics at the AP or using CSI feedback, for example. In an embodiment, the channel estimation unit 62 executes block 204 at least partially, and implements any suitable technique including those discussed above (e.g., zero-forcing, leakage suppression, block nullification, minimizing MSE).

Next, at block 204, several steering vectors are concurrently generated in view of multiple channel descriptions. In an example scenario, three steering vectors for use with three receiving stations are concurrently generated in view of the three channel descriptions corresponding to the three channels via which data is simultaneously transmitted to the stations. According to an embodiment, block 204 is implemented by the steering vector controller 60.

Figure 5:
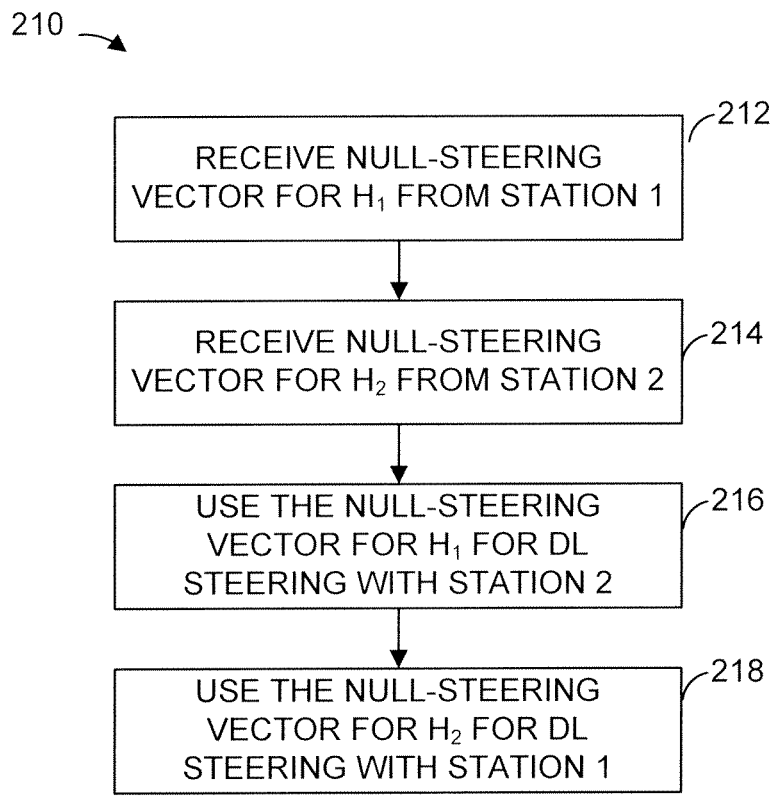
FIG. 5 is a flow diagram of an example method for generating a pair of steering vectors for use with two stations operating in an SDMA mode, according to an embodiment.

FIG. 5 is a flow diagram of an example method 210 that an AP implements to generate a pair of transmit steering vectors for simultaneous transmission of data to a corresponding pair of stations, according to an embodiment. The method 210 yields steering vectors that form an aggregate steering vector similar to a block-nullified aggregate steering vector, for example. The DL SDMA controller 19 or the DL SDMA controller 50, for example, is configured to implement the method 210, according to some embodiments.

At block 212, an indication (e.g., mathematical description) of a first null-steering vector for a communication channel between the AP and the first station is received. The first null-steering vector corresponds to a null-space projection of the first communication channel. In other words, for a communication channel described by $H_1$, the first null-steering vector is a vector that the AP can apply to completely or nearly completely attenuate a signal a station will receive via the communication channel described by $H_1$. Next, at block 214, an indication of a second null-steering vector for a communication channel between the AP and the second station is received. Similar to the first null-steering vector, the second null-steering vector is a vector that the AP can apply to completely or nearly completely attenuate a signal a station will receive via the communication channel described by $H_2$.

At blocks 216 and 218, steering vectors for use in simultaneous downlink transmissions to the first station and the second station are generated using the first null-steering vector and the second null-steering vector. In particular, the steering vector $W_1$ for use with the first station and the channel described by $H_1$ is assigned the value of the second null-steering vector, and the steering vector $W_2$ for use with the second station and the channel described by $H_2$ is assigned the value of the first null-steering vector. In this manner, a pair of transmit steering vectors $W_1$ and $W_2$ is developed for simultaneous transmission of data to the first and second stations.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a communication network, the method comprising:
    obtaining a description of a first communication channel associated with a first receiver;
    obtaining a description of a second communication channel associated with a second receiver; and
    generating a first steering vector and a second steering vector using each of the description of the first communication channel and the description of the second communication channel, wherein generating the first steering vector and the second steering vector includes:
        generating an aggregate channel matrix that includes the description of the first communication channel and the description of the second communication channel as respective elements, and
        generating an aggregate steering matrix that includes the first steering vector and the second vector as respective elements,
        wherein a product of the aggregate channel matrix and the aggregate steering matrix is a diagonal matrix;
    wherein the first steering vector is used to transmit first data to the first receiver via a plurality of antennas over the first communication channel and the second steering vector is used to simultaneously transmit second data to the second receiver via the plurality of antennas over the second communication channel.

2. The method of claim 1, wherein the first steering vector and the second steering vector are concurrently generated so as to (i) attempt to minimize interference caused by transmitting the first data to the first receiver at the second receiver, and (ii) attempt to minimize interference caused by transmitting the second data to the second receiver at the first receiver.

3. The method of claim 2, wherein the first steering vector and the second steering vector are generated so as to (iii) attempt to minimize interference on a first spatial stream caused by a second spatial stream, wherein the first spatial stream and the second spatial stream are associated with the first communication channel, and (iv) attempt to minimize interference on a third spatial stream caused by a fourth spatial stream, wherein the third spatial stream and the fourth spatial stream are associated with the second communication channel.

4. The method of claim 1, wherein the diagonal matrix is an identity matrix.

5. The method of claim 1, wherein the first steering vector and the second steering vector are concurrently generated so as to attempt to minimize receiver input Mean Square Error (MSE) at each of the first receiver and the second receiver.

6. The method of claim 1, wherein the first steering vector and the second steering vector are concurrently generated so as to attempt to maximize signal-to-leakage-plus-noise ratio (SLNR) at each of the first receiver and the second receiver.

7. The method of claim 1, wherein:
    obtaining the description of the first communication channel includes receiving a first channel state information (CSI) metric from the first receiver; and
    obtaining the description of the second communication channel includes receiving a second channel state information (CSI) metric from the second receiver.

8. The method of claim 1, further comprising:
    applying the first steering vector to a first symbol vector associated with the first data to generate a first product vector;
    applying the second steering vector to a second symbol vector associated with the first data to generate a second product vector; and
    combining the first product vector and the second product vector to generate a combined vector to be transmitted via the plurality of antennas.

9. An apparatus comprising:
a steering vector controller configured to
generate a first steering vector using each of a description of a first communication channel and a description of a second communication channel, and
generate a second steering vector using each of the description of the first communication channel and the description of the second communication channel, wherein generating the first steering vector and the second steering vector comprises
generating an aggregate channel matrix that includes the description of the first communication channel and the description of the second communication channel as respective elements, and
generating an aggregate steering matrix that includes the first steering vector and the second steering vector as respective elements, wherein a product of the aggregate channel matrix and the aggregate steering matrix is a diagonal matrix;
wherein the first steering vector and the steering vector are used to simultaneously transmit first data and second data via an antenna array over the first communication channel and the second communication channel, respectively.

10. The apparatus of claim 9, further comprising a channel estimation unit to generate each of the description of the first communication channel and the description of a second communication channel.

11. The apparatus of claim 9, further comprising a spatial mapping unit configured to:
apply the first steering vector to a first symbol vector to generate a first product vector, wherein the first symbol vector corresponds to a mapping of the first data to a first plurality of spatial streams,
apply the second steering vector to a second symbol vector to generate a second product vector, wherein the second symbol vector corresponds to a mapping of the second data to a second plurality of spatial streams, and
combine at least the first product vector with the second product vector to generate a combined vector to be transmitted via the plurality of antennas.

12. The apparatus of claim 9, wherein the steering vector controller includes a (ZF) zero-forcing module that concurrently generates the first steering vector and the second steering vector so as to (i) attempt to minimize interference caused by transmitting the first data to the first receiver at a second receiver associated with the second communication channel, and (ii) attempt to minimize interference caused by transmitting the second data to the second receiver at a first receiver associated with the first communication channel, (iii) attempt to minimize interference between a first plurality of spatial streams associated with the first communication channel, and (iv) attempt to minimize interference between a second plurality of spatial streams associated with the first communication channel.

13. The apparatus of claim 9, wherein the steering vector controller includes a block-nullification (BN) module that concurrently generates the first steering vector and the second steering vector so as to (i) attempt to minimize interference caused by transmitting the first data to the first receiver at a second receiver associated with the second communication channel, and (ii) attempt to minimize interference caused by transmitting the second data to the second receiver at a first receiver associated with the first communication channel, (iii) not attempt to minimize interference between a first plurality of spatial streams associated with the first communication channel, and (iv) not attempt to minimize interference between a second plurality of spatial streams associated with the second communication channel.

14. The apparatus of claim 9, wherein the steering vector controller includes a minimum mean-square-error (MMSE) module that concurrently generates the first steering vector and the second steering vector so as to attempt to minimize receiver input Mean Square Error (MSE) at each of a first receiver associated with the first communication channel and a second receiver associated with the second communication channel, respectively.

15. The apparatus of claim 9, wherein the steering vector controller includes a minimum mean-square-error (MMSE) module that concurrently generates the first steering vector and the second steering vector so as to attempt to maximize signal-to-leakage-plus-noise ratio (SLNR) at each of a first receiver associated with the first communication channel and a second receiver associated with the second communication channel, respectively.

16. A system comprising:
a transmitter including
a plurality of antennas, and
a steering vector controller,
wherein the system further comprises a plurality of receivers, wherein the transmitter and each of the plurality of receivers are associated with a corresponding communication channel to define a plurality of communication channels, and
wherein the steering vector controller is configured to
generate an aggregate channel matrix that includes a description of each of the plurality of communication channels as respective elements, and
generate an aggregate steering matrix that includes a plurality of steering vectors as respective elements, wherein the aggregate steering matrix is generated based on a description of the plurality of communication channels, wherein a product of the aggregate channel matrix and the aggregate steering matrix is a diagonal matrix:
wherein the plurality of steering vectors are used to simultaneously transmit a plurality of data units to the plurality of receivers via the plurality of antennas over the plurality of communication channels.

17. The system of claim 16, wherein each of the plurality of communication channels is associated with a respective plurality of spatial streams.

* * * * *